United States Patent [19]

Onda

[11] Patent Number: 5,956,538
[45] Date of Patent: Sep. 21, 1999

[54] CAMERA AND FILM FEEDING MECHANISM

[75] Inventor: Kazuhiko Onda, Saitama, Japan

[73] Assignee: Fuji Photo Optical Co., Ltd., Saitama, Japan

[21] Appl. No.: 08/989,429

[22] Filed: Dec. 12, 1997

[30] Foreign Application Priority Data

Dec. 13, 1996 [JP] Japan ................................. 8-333677

[51] Int. Cl.⁶ ................................................. G03B 1/00
[52] U.S. Cl. ........................ 396/418; 396/411; 396/542
[58] Field of Search ................................. 396/387, 411, 396/412, 413, 414, 415, 418, 542

[56] References Cited

U.S. PATENT DOCUMENTS

| | | | |
|---|---|---|---|
| 4,992,811 | 2/1991 | Fridman | 396/413 |
| 5,628,040 | 5/1997 | Lee | 396/413 |
| 5,640,637 | 6/1997 | Stephenson, III | 396/411 |
| 5,640,638 | 6/1997 | Omiya | 396/411 |
| 5,682,565 | 10/1997 | Kamoda et al. | 396/411 |
| 5,689,744 | 11/1997 | Kaihara | 396/411 |

*Primary Examiner*—Russell Adams
*Attorney, Agent, or Firm*—Leydig, Voit & Mayer, Ltd.

[57] ABSTRACT

A cartridge spool rotating device is disposed in a cartridge chamber to rotate a spool included in a film cartridge. A spool is disposed in a film take-up chamber to take up film from the film cartridge. A power unit drives the cartridge spool rotating device and the spool. A gear train is arranged along an upper inner surface of a camera case. A driving force generated by the power unit is transmitted by the gear train between the cartridge spool rotating device and the spool.

15 Claims, 3 Drawing Sheets

CAMERA AND FILM FEEDING MECHANISM

BACKGROUND OF THE INVENTION

1. Field of the Invention

The present invention relates to a camera and a film feeding mechanism.

2. Related Background Art

A camera using a film cartridge generally has a cartridge chamber for housing a film cartridge and a film take-up chamber for housing film taken up from the film cartridge. A lens barrel is disposed between the cartridge chamber and the film take-up chamber. The film is delivered between the cartridge chamber and the film take-up chamber through the back of the lens barrel. A spool serving as a winding shaft of the film is disposed in the cartridge chamber. The spool of the cartridge chamber and a spool of the cartridge are rotated so as to deliver the film. A single power unit such as an electric motor is generally used to rotate the spools. Accordingly, a film feeding mechanism includes a transmitting mechanism for transmitting a driving force generated by the power unit to each spool.

SUMMARY OF THE INVENTION

The present invention has an object to provide a compact camera and a film feeding mechanism which enables a camera to be compact.

Many components are arranged in the camera such as an automatic focusing mechanism, a viewfinder, and an electronic flash, in addition to the film feeding mechanism. The present inventors have made an extensive study on using the limited internal space of a camera efficiently in order to provide a compact camera including a film feeding mechanism.

A camera according to the present invention comprises a camera case, a cartridge chamber for housing a film cartridge, a film take-up chamber for housing film taken up from the film cartridge, a lens barrel disposed between the cartridge chamber and the film take-up chamber, a cartridge spool rotating device disposed in the cartridge chamber to rotate a spool included in the film cartridge, a spool disposed in the film take-up chamber to take up the film from the film cartridge, a power unit for driving the cartridge spool rotating device and the spool, and a gear train arranged along a upper inner surface of the camera case to transmit a driving force generated by the power unit between the cartridge spool rotating device and the spool.

Furthermore, a film feeding mechanism according to the present invention is used for a camera having a camera case housing a cartridge chamber and a film take-up chamber, and the film feeding mechanism comprising a cartridge spool rotating device disposed in the cartridge chamber to rotate a spool included in a film cartridge, a spool disposed in the film take-up chamber to take up the film from the film cartridge, a power unit for driving the cartridge spool rotating device and the spool, and a gear train arranged along a upper inner surface of the camera case to transmit a driving force generated by the power unit between the cartridge spool rotating device and the spool.

According to the present invention, the entire space between the gear train and the lens barrel is obtained. This space can be used for arranging components required by the camera. For example, a view finder is arranged between the gear train and the lens barrel. As a result, a limited inner space of the camera is efficiently used, so that the camera can be compact and the film feeding mechanism enables a camera to be compact.

Preferably, the gear train is disposed along a printed circuit board on which a camera control circuit is mounted. Moreover, an insulating sheet is disposed between the gear train and the printed circuit board.

Preferably, the power unit is disposed within the spool, and the gear train transmits the driving force to the cartridge spool rotating device. As a result, the camera can be compact and the film feeding mechanism enables a camera to be compact.

Preferably, the gear train comprises a reduction gear train disposed above the power unit, and a constant speed gear train disposed along the upper inner surface of the camera case. Moreover, the constant speed gear train comprises a plurality of spur gears. As a result, the driving force can be efficiently transmitted between the cartridge spool rotating device and the spool, and the space required for the gear train can be decreased.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENT

Figure 1:
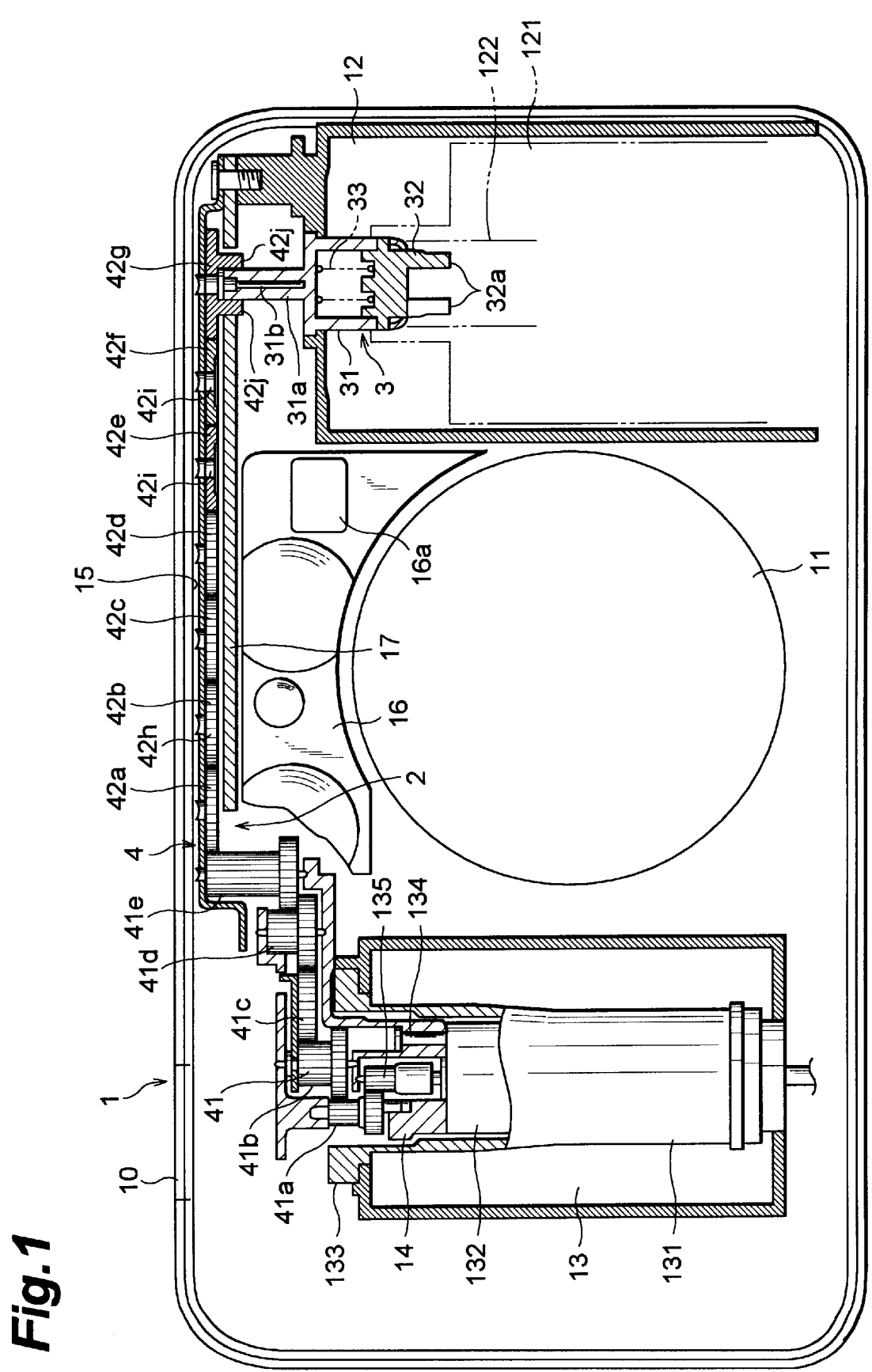
FIG. 1 is a sectional view of a camera.

FIG. 1 is a sectional view of a camera according to the present invention. As shown in FIG. 1, a cylindrical shaped lens barrel 11 for focusing an object image on a film is disposed in a camera case 10 of the camera 1. A cartridge chamber 12 is disposed on one side of the lens barrel 11 and a film take-up chamber 13 is disposed on the other side of the lens barrel 11. The lens barrel 11 is arranged between the cartridge chamber 12 and the film take-up chamber 13. A film cartridge 121 is housed in the cartridge chamber 12. The film is pulled out from the film cartridge 121 and delivered through the back of the lens barrel 11 so as to be taken up into the film take-up chamber 13.

A spool 131 serving as a film winding shaft is disposed in the film take-up chamber 13. As shown in FIG. 1, the spool 131 has a cylindrical shape. The spool 131 is vertically disposed in the film take-up chamber 13. The spool 131 extends through the upper and bottom surfaces of the film take-up chamber 13 and is supported by the upper and bottom surfaces to be rotatable.

A motor 132 is inserted within the spool 131. As shown in FIG. 1, the motor 132 is fixed in an inner frame 14 of the camera 1 with a pin 134. As a result, the motor 132 does not rotate together with the spool 131. The motor 132 serves as a power unit for film feeding. A flange-like external gear 133 is formed at the upper portion of the spool 131. The driving force generated by the motor 132 is transmitted to the spool 131 through the external gear 133.

When the motor 132 rotates in a predetermined direction, the driving force is transmitted to the spool 131. The driving force rotates the spool 131 to pull out the film from the film cartridge 121 and to take-up the film around the spool 131. When the motor 132 rotates in the reverse direction, the driving force is transmitted to the cartridge chamber 12 through a film feeding mechanism 2. The film taken up around the spool 131 in the film take-up chamber 12 is wound into the cartridge 121 housed in the cartridge chamber 12. Control of the motor 132 is carried out by a camera control circuit (not shown) included in the camera 1. The motor 132 can be rotated in a desired direction at a desired speed.

As shown in FIG. 1, the film feeding mechanism 2 has a gear train 4 for transmitting the driving force generated by the motor 132 from the film take-up chamber 13 side to the cartridge chamber 12 side. The gear train 4 is composed of a reduction gear train 41 having a decelerating function and a constant speed gear train 42 disposed along an upper inner surface 15 of the camera case 14. The gears arranged in the reduction gear train 41 and the constant speed gear train 42 are rotatably supported to face the vertical direction. As a result, the driving force is transmitted in the horizontal direction, so that the transmission efficiency of the driving force can be improved.

The reduction gear train 41 decelerates the rotational speed of the motor 132, and transmits the decelerated driving force to the constant speed gear train 42. The reduction gear train 41 has five gears 41a to 41e which are supported on the inner frame 14 to be rotatable. The gear 41a is a reduction gear formed by integrating a gear wheel and a pinion around a same axis. The gear wheel is engaged with a pinion 135 fitted to the shaft of the motor 132. The gear 41b is also a reduction gear formed by integrating a gear wheel and a pinion around a same axis.

The gear 41c is a planetary gear which is engaged with the gear 41b and is capable of revolving around the gear 41b. The gear 41c selectively transmits the driving force from the gear 41b to the gear 41d or a spool driving gear (not shown) which is engaged with the external gear 133 of the spool. The gear 41c is fitted to a plate so as to be rotatable. The plate is mounted on a shaft pin of the gear 41b so as to be rotatable, as shown in FIG. 1. When the gear 41b is rotated in predetermined direction, the gear 41c is engaged with the gear 41d to transmit the driving force to the constant speed gear train 42. On the other hand, when the gear 41b is rotated in the reverse direction, the gear 41c is engaged with the spool driving gear to rotate the spool 131. The gear 41d is also a reduction gear formed by integrating the gear wheel and a pinion around a same axis. The gear wheel of the gear 41d is engaged with the gear 41c. Further, the gear 41e is similarly a reduction gear formed by integrating a gear wheel and a pinion around a the same axis. The gear wheel of the gear 41e is engaged with the pinion of the gear 41d and the pinion of the gear 41e is engaged with a spur gear 42a of the constant speed gear train 42. The gear 41e is rotatably supported between the inner frame 14 and a flat plate 42h.

The constant speed gear train 42 is composed of a plurality of gears continuously arranged to be on the same level and is capable of efficiently transmitting the driving force generated by the motor 132 to the cartridge chamber 12 side. As shown in FIG. 1, the constant speed gear train 42 is disposed along the upper inner surface 15 of the camera case 10. The clearance between the upper surface of the a flat plate 42h of the gear train 15 and the upper inner surface 15 is very small. The constant speed gear train 42 has seven spur gears 42a to 42g. The spur gears 42a to 42g are rotatably supported with pins 42i on the flat plate 42h which is horizontally arranged along the upper inner surface 15 of the camera case 14. As a result, the entire space between the constant speed gear train 42 and the lens barrel 11 can be obtained. In this space, components such as a viewfinder, automatic focusing mechanism and the like can be arranged. Moreover, the height of the camera is decreased, so that the camera can be compact. Preferably, the flat plate 42h and the pins 42i are made of a metal, and the pins 42i are fixed to the flat plate 42h by caulking. In this case, the total height of the constant speed gear train 42 can be made small.

Figure 2:
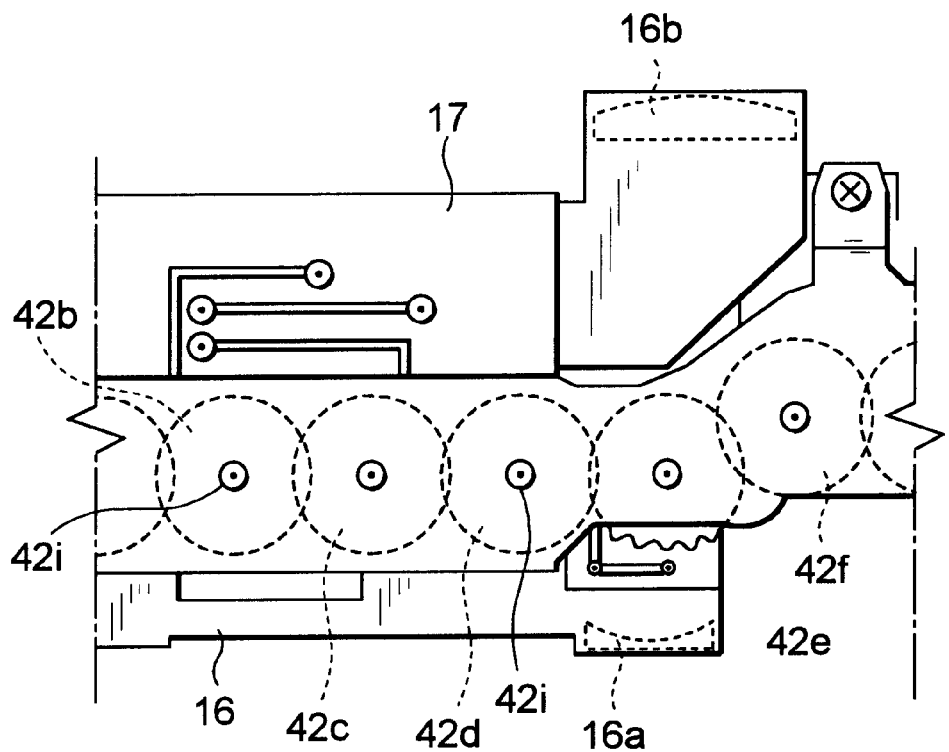
FIG. 2 is a partially enlarged view of a film feeding mechanism.

Further, the space above the lens barrel 11 joins with the space between the lens barrel 11 and the cartridge chamber 12, and the space between the lens barrel 11 and the film take-up chamber 13 has a substantially triangular pole-like shape. As a result, the space between the constant speed gear train 42 and the lens barrel 11 can be enlarged. In the triangular pole-shaped spaces, for example, it is possible to arrange a viewfinder unit 16 including an automatic focusing mechanism which is molded to conform to the outline of the lens barrel 11, or a date printing unit. Accordingly, the space around the lens barrel 11 can be efficiently used without any waste. In addition, as shown in FIG. 2, an objective optical system 16a in the viewfinder unit 16 is disposed below the constant speed gear train 42, and an eyepiece 16b is disposed behind the constant speed gear train 42. As a result, the limited inner space of the camera 1 is efficiently used.

Preferably, as shown in FIG. 1, the constant speed gear train 42 is disposed along a printed circuit board 17 on which the camera control circuit for controlling the automatic focusing mechanism and the like is mounted. That is, the constant speed gear train 42 is positioned between the upper inner surface 15 of the camera case 10 and the printed circuit board 17. Since the constant speed gear train 42 having a flat shape is disposed along the flat printed board 17, the limited internal space of the camera 1 can be more efficiently used, so that the camera 1 can be compact.

Figure 3:
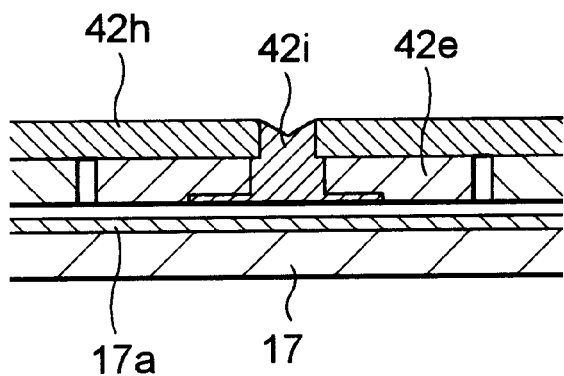
FIG. 3 is an enlarged sectional view of the film feeding mechanism.

In this case, as shown in FIG. 3, an insulating sheet 17a is attached on the upper surface of the printed board 17. As the insulating sheet 17a, a resin film having insulating properties and low friction coefficient maybe used. As a result, the pins 42i of the constant speed gear train 42 do not contact the wiring on the printed circuit board 17, so that a trouble such as a short circuit can be prevented and the gears rotate smoothly. Also, the rotating gears do not directly contact the wiring on the printed circuit board 17, so the operation of the camera 1 can be kept satisfactory.

The gear 42g of the constant speed gear train 42 is located above the cartridge chamber 12. The driving force generated by the motor 132 is transmitted from the gear 42g to a cartridge spool rotating device 3 arranged in the upper portion of the cartridge chamber 12. The cartridge spool rotating device 3 rotates the spool 122 of the film cartridge 121 to take up the film into the cartridge 121. The cartridge spool rotating device 3 comprises a casing 31, an engaging member 32 and coil spring 33. The engaging member 32 is biased downward by the coil spring 33 within the casing 31. Pawls 32a are projected from the bottom surface of the engaging member 32 and the pawls 32a are exposed from the bottom of the casing 31. A rod 31a extends upward from the upper surface of the casing 31. The rod 31a has a hole 31b extending vertically.

Figure 4:
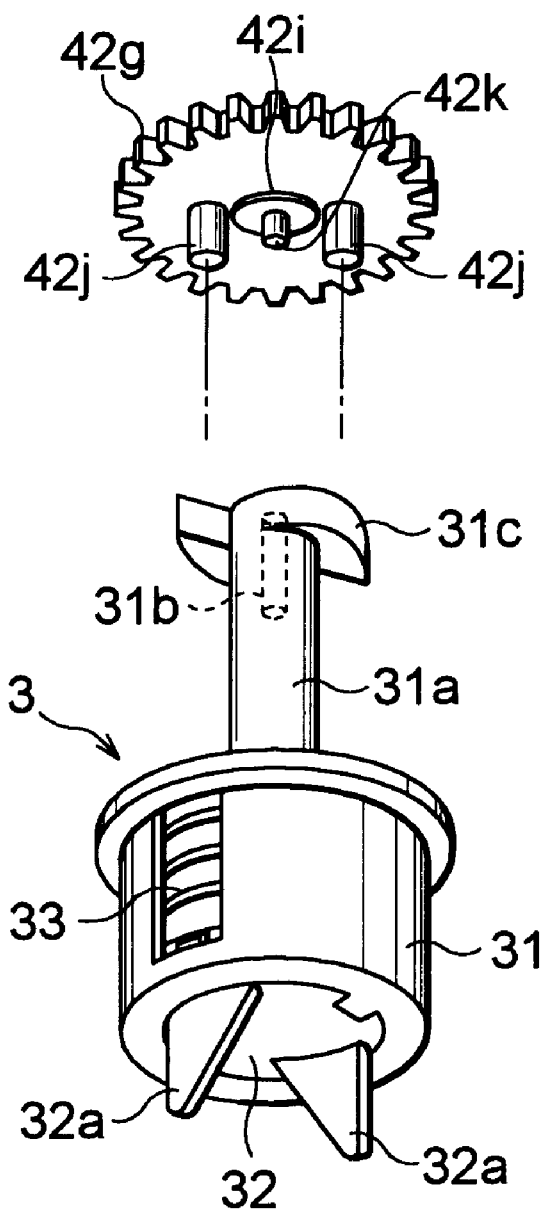
FIG. 4 is a perspective view of a cartridge spool rotating mechanism.

On the other hand, as shown in FIG. 4, the gear 42g has two projections 42j on its lower surface. The projections 42j are engaged with an engaging head 31c of the rod 31a. As a result, when the gear 42g is rotated, the cartridge spool rotating device 3 is rotated together with the gear 42g. Moreover, a projection 42k is formed on the pin 42i for supporting the gear 42g. The projection 42k is inserted into in the hole 31b of the rod 31a. Accordingly, since the rod portion 31a is supported by the pin 42i, the cartridge spool rotating device 3 can be stably rotated, and the driving force can be efficiently and reliably transmitted from the constant speed gear train 42 to the cartridge spool rotating device 3.

Next, the operation of the film feeding mechanism 2 will be described.

When the cartridge 121 is loaded in the cartridge chamber 12, one end of the spool 122 of the cartridge 121 is engaged with the pawl 32a of the cartridge spool rotating device 3. When a cover for the cartridge chamber (not shown) is closed, the motor 132 starts to rotate and the gear 135 is rotated. The driving force generated by the motor 132 is transmitted to gear 41a which is engaged with the gear 135. When the gear 41b is rotated by the gear 41a, in this case, the gear 41c is engaged with the spool driving gear (not shown) to rotate the spool 131. As a result, the film is pulled out from the film cartridge and delivered through the back of the lens barrel 11 to be taken up around the spool 131 in the film take-up chamber 13. When a last frame (first photographed frame) of the film arrives at the back of the lens barrel 11, the motor 132 is stopped and the camera 1 is in a stand-by state.

When a shutter button is operated by a user in the stand-by state, the motor 132 starts to rotate. The motor 132 is rotated every shutter release. The driving force generated by the motor 132 is transmitted to the gear 41a by the gear 135. When the gear 41b is rotated by the gear 41a, in this case, the gear 41c is engaged with the gear 41d. As a result, the driving force is reduced in speed by the reduction gear train 41 which comprises the gear 41a to gear 41e. Then, the driving force is transmitted to the gear 42a which is engaged with the gear 41e. The driving force is sequentially transmitted through the gear 42a to gear 42g on the same level. Further, the driving force is transmitted from the gear 42g of the constant speed gear train 42 to the cartridge spool rotating device 3. Then, the cartridge spool rotating device 3 rotates the spool 122 of the film cartridge 121 so as to take up the film by one frame into the cartridge 121. This one frame take-up operation is carried out every shutter release. After the last photographed frame (first frame) is exposed, the film is entirely taken up into the cartridge 121. Incidentally, as has been described above, the film feeding mechanism 2 is applied to the camera 1 in which the film is entirely taken up around the spool 131 before the first photographing. However, the above described film feeding mechanism can be applied to the camera in which the film is pulled out from the film cartridge frame by frame every shutter release.

As has been described above, the present invention provides a compact camera and a film feeding mechanism for a compact camera by disposing a flat-shaped gear train of the film feeding mechanism along an upper inner surface of a camera case.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A camera comprising:

a camera case;

a cartridge chamber for housing a film cartridge;

a film take-up chamber for housing film taken up from the film cartridge;

a lens barrel disposed between the cartridge chamber and the film take-up chamber;

a view finder unit disposed between the lens barrel and an upper inner surface of the camera case;

a cartridge spool rotating device disposed in the cartridge chamber to rotate a spool included in the film cartridge;

a spool disposed in the film take-up chamber to take up the film from the film cartridge;

a power unit for driving the cartridge spool rotating device and the spool; and a gear train arranged along the upper inner surface of the camera case between the view finder unit and the upper inner surface to transmit a driving force generated by the power unit between the cartridge spool rotating device and the spool.

2. A camera according to claim 1, wherein the gear train is disposed between a printed circuit board, disposed above the view finder unit, on which a camera control circuit is mounted and the upper inner surface of the camera case.

3. A camera according to claim 2, wherein an insulating sheet is disposed between the gear train and the printed circuit board.

4. A camera according to claim 1, wherein the power unit is inserted within the spool, and the gear train transmits the driving force to the cartridge spool rotating device.

5. A camera according to claim 2, wherein the gear train comprises a reduction gear train disposed above the power unit, and a constant speed gear train disposed along the upper inner surface of the camera case.

6. A camera according to claim 5 including a flat plate opposing the upper inner surface of the camera case, wherein the constant speed gear train is rotatably mounted on the plate between the plate and the view finder unit.

7. A camera according to claim 6 wherein the flat plate is closely spaced from the upper inner surface of the camera case with no members disposed therebetween.

8. A camera according to claim 3, wherein the constant speed gear train comprises a plurality of spur gears.

9. A camera according to claim 4, wherein a view finder is arranged between the gear train and the lens barrel.

10. A film feeding mechanism for a camera having a camera case housing a cartridge chamber and a film take-up chamber, a lens barrel arranged between the cartridge chamber and the film take-up chamber, and a view finder unit arranged between the lens barrel and an upper inner surface of the camera case, the film feeding mechanism comprising:

a cartridge spool rotating device disposed in the cartridge chamber to rotate a spool included in a film cartridge;

a spool disposed in the film take-up chamber to take up film from the film cartridge;

a power unit for driving the cartridge spool rotating device and the spool; and a gear train arranged along the upper inner surface of the camera case between the view finder unit and the upper inner surface to transmit a driving force generated by the power unit between the cartridge spool rotating device and the spool.

11. A film feeding mechanism according to claim 10, wherein the gear train is disposed between a printed circuit board, disposed above the view finder unit, on which a camera control circuit is mounted and the upper inner surface of the camera case.

12. A film feeding mechanism according to claim 11, wherein an insulating sheet is disposed between the gear train and the printed circuit board.

13. A film feeding mechanism according to claim 8, wherein the power unit is inserted within the spool, and the gear train transmits the driving force to the cartridge spool rotating device.

14. A film feeding mechanism according to claim 9, wherein the gear train comprises a reduction gear train disposed above the power unit, and a constant speed gear train disposed along the upper inner surface of the camera case.

15. A film feeding mechanism according to claim 10, wherein the constant speed gear train comprises a plurality of spur gears.

* * * * *